United States Patent
Haber (10) Patent No.: US 9,851,249 B2
(45) Date of Patent: Dec. 26, 2017

(54) METHOD FOR ENABLING SYSTEM OPERATION BASED ON A SPECTRAL FINGERPRINT

(71) Applicant: Micron Optics, Inc., Atlanta, GA (US)

(72) Inventor: Todd Christian Haber, Johns Creek, GA (US)

(73) Assignee: Micron Optics, Inc., Atlanta, GA (US)

( * ) Notice: Subject to any disclaimer, the term of this patent is extended or adjusted under 35 U.S.C. 154(b) by 143 days.

(21) Appl. No.: 15/051,280

(22) Filed: Feb. 23, 2016

(65) Prior Publication Data

US 2016/0245692 A1     Aug. 25, 2016

Related U.S. Application Data

(60) Provisional application No. 62/119,346, filed on Feb. 23, 2015.

(51) Int. Cl.
| | |
|---|---|
| *G01J 3/26* | (2006.01) |
| *G01J 3/10* | (2006.01) |
| *G01J 3/28* | (2006.01) |
| *G01J 3/42* | (2006.01) |

(52) U.S. Cl.
CPC . *G01J 3/10* (2013.01); *G01J 3/26* (2013.01); *G01J 3/28* (2013.01); *G01J 3/42* (2013.01)

(58) Field of Classification Search
CPC ........ G01J 3/10; G01J 3/26; G01J 3/28; G01J 3/42
See application file for complete search history.

(56) References Cited

U.S. PATENT DOCUMENTS

| | | | | |
|---|---|---|---|---|
| 2002/0131104 | A1* | 9/2002 | Johnson | H04B 10/077 398/34 |
| 2002/0163646 | A1* | 11/2002 | Anderson | G02F 1/3517 356/477 |
| 2002/0191652 | A1* | 12/2002 | Ema | H01S 5/141 372/20 |
| 2005/0269489 | A1* | 12/2005 | Taverner | G01J 3/1895 250/227.14 |

* cited by examiner

*Primary Examiner* — Hwa Lee (74) *Attorney, Agent, or Firm* — Kaplan Breyer Schwarz, LLP (57) ABSTRACT

A sensor system is disclosed, wherein the sensor system provides output data only when the error between a plurality of measured absorption wavelengths of a gas cell and a plurality of known absorption lines for the gas cell is less than or equal to a user-defined error margin.

16 Claims, 14 Drawing Sheets

METHOD FOR ENABLING SYSTEM OPERATION BASED ON A SPECTRAL FINGERPRINT

CROSS REFERENCE TO RELATED APPLICATIONS

This application claims the benefit of U.S. Provisional Application Ser. No. 62/119,346, filed Feb. 23, 2015, entitled "Method for Enabling System Operation Based on a Spectral Fingerprint", which is incorporated herein by reference. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to optical systems in general, and, more particularly, to spectrally sensitive optical sensor systems.

BACKGROUND OF THE INVENTION

In many optical systems, such as telecommunications networks, optical sensors, etc., proper operation depends upon precise registration of an optical signal to a specific wavelength of light. In a wavelength-division-multiplexed (WDM) optical telecommunications system, for instance, information is carried on multiple optical signals, each of which characterized by a different wavelength of light. For proper system operation, the wavelength of each optical signal must be characterized by the correct wavelength. When one or more of the wavelength signals drifts from its defined wavelength, due to temperature or alignment changes, the signal-to-noise ratio (SNR) of the information carried on these signals is degraded. As a result, tremendous effort is expended to ensure proper registration of the WDM signals to the standardized International Telegraph Union (ITU) wavelength grid.

In some optical sensor systems, a change in the wavelength of one or more spectral features in an output signal indicates a change in a parameter being sensed. Proper system operation depends on an accurate knowledge of the absolute wavelength values of these spectral features.

Often, proper wavelength registration of a laser source in such systems is maintained by a feedback system comprising a calibrated gas cell, where the output wavelength of the laser-based transmitter is adjusted based on one or more spectral signals provided by the gas cell. A gas cell is an optical element that contains a known gas that absorbs a characteristic set of specific wavelengths (i.e., its absorption spectrum). Because the absorption spectrum of a gas is not a function of temperature, a gas cell provides a temperature-invariant wavelength reference to which the output of the laser source can be compared. In typical operation, the output of the gas cell is detected at a photodiode, amplified, and digitized. The digitized signal is then processed in a microprocessor, which, in turn, controls the temperature or electrical bias of the laser to tune its output wavelength to its proper wavelength.

Unfortunately, in many systems, even the use of feedback control does not guarantee that the optical signal of concern is held to its desired wavelength with sufficient precision to avoid optical and/or electrical errors in system operation. An ability to avoiding the transmission of erroneous output data from such systems would be a significant advance in the state of the art.

SUMMARY OF THE INVENTION

The present invention enables substantially error-free performance of a spectrally sensitive optical system by employing a gas cell as an "interlock," wherein the output of the system is disabled unless the spectral characteristics of the gas cell are properly detected. Embodiments of the present invention employ a "key-fit" algorithm, wherein the transmission of output data is only enabled in the absence of any optical and/or electrical errors within the system. Embodiments of the present invention are particularly well suited for use in systems in which the knowledge of, or generation of, precise wavelengths is critical.

An illustrative embodiment comprises a sensor system that includes a swept-wavelength source that provides a light signal to each of a sensor network and a reference module. The sensor network includes one or more sensors that provide output signals whose spectral characteristics are based on an environmental stimulus.

The reference module includes a fiber Bragg grating, an athermal Fabry Perot interferometer, and a calibrated gas cell. The fiber Bragg grating generates an output signal having a feature (e.g., a peak or null) at a characteristic, known wavelength. The athermal Fabry Perot interferometer provides an output signal that is characterized by a set of wavelength peaks having a known and stable spectral separation. The gas cell is characterized by a known set of absorption peaks. The outputs of these three elements are used to calibrate the source and establish a relationship between the wavelength of the source output and time within each sweep period.

Further, once the source is calibrated and the relationship between wavelength and time is established, operation of the sensor system is continuously monitored by measuring the absorption lines of the gas cell and comparing the measured results with the wavelength values at which these absorption lines are known to occur. If the measured wavelengths of the absorption lines deviate from the set of known wavelengths by an amount that exceeds a user-defined threshold, transmission of output data by the sensor system is disabled. As a result, the present invention disallows the transmission of "bad data" by the sensor system.

A method for preventing transmission of erroneous data from a sensor system, the method comprising: providing a gas cell characterized by a plurality of known absorption lines; measuring the gas cell to determine a plurality of measured absorption lines, wherein each of the plurality of measured absorption lines corresponds to a different one of the known absorption lines; determining a plurality of error values, each error value being the difference between a different one of the measured absorption lines and its corresponding known absorption line; and disabling the transmission of data from the sensor system if any one of the plurality of error values exceeds a user-defined threshold.

DETAILED DESCRIPTION

Figure 1:
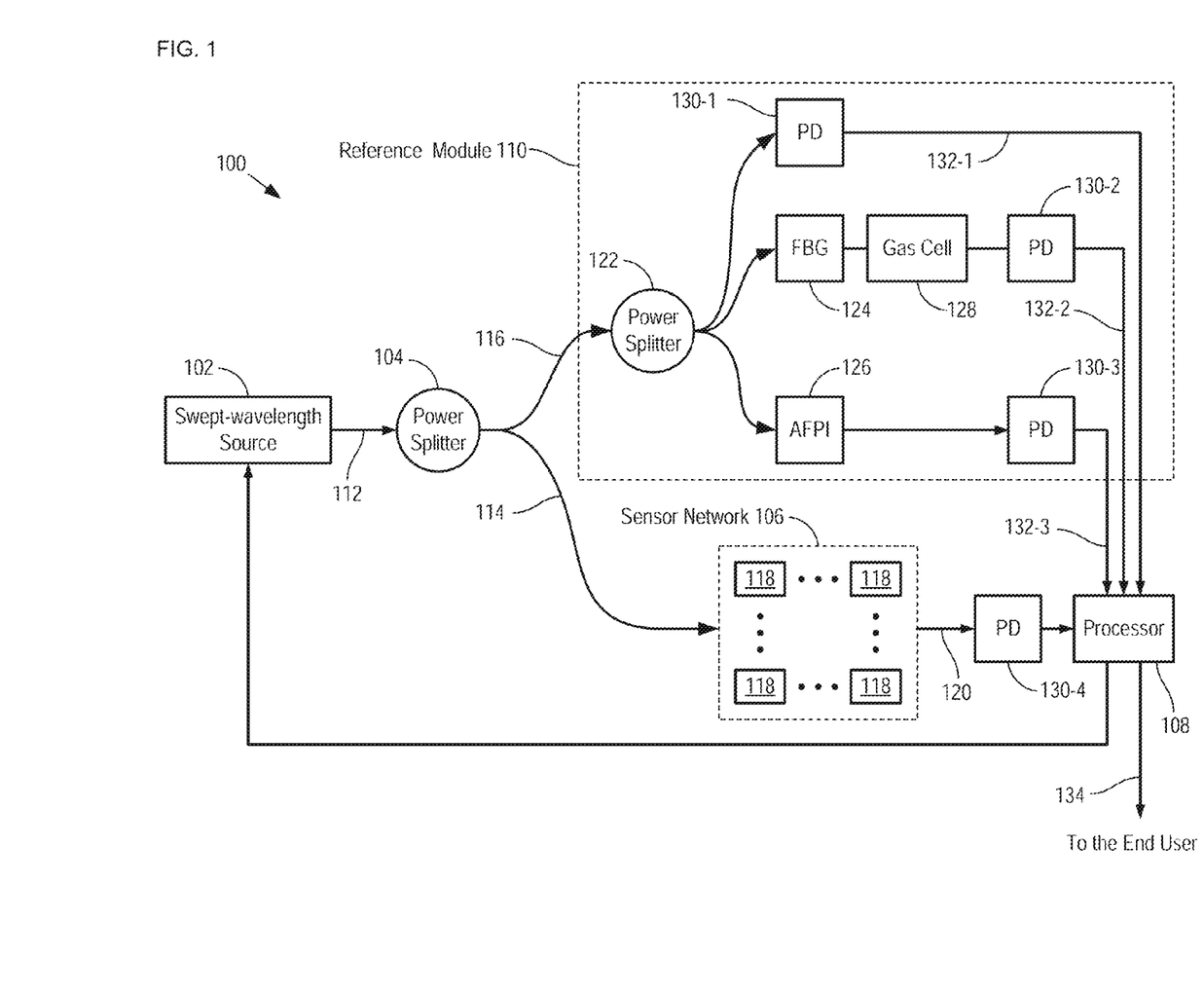
FIG. 1 depicts a sensor system in accordance with an illustrative embodiment of the present invention.

FIG. 1 depicts a sensor system in accordance with an illustrative embodiment of the present invention. System 100 includes source 102, power splitter 104, sensor network 106, processor 108, and reference module 110.

System 100 monitors one or more environmental stimuli (e.g., strain, acceleration, gravity, temperature, pressure, etc.) by means of sensor network 106, which includes one or more sensors 118 deployed at a desired location (or locations). Each of sensors 118 is an optical sensor, such as a fiber Bragg grating, Fabry-Perot interferometer, and the like, which returns spectral information indicative of the environmental stimulus it monitors. Sensors 118 are interrogated with light signal 112, which is a periodic, swept-wavelength light signal. Since the wavelength of the signal provided to each sensor is a function of time, a time-dependency is imprinted on the spectral content of the output of each sensor. Analysis of this time dependency provides a straightforward, high-resolution means of detecting the spectral response of each sensor.

Source 102 is a swept-wavelength source that generates light signal 112 as a narrow spectrum signal whose center wavelength repeatedly sweeps through a desired wavelength range. In some embodiments, source 102 includes a semiconductor optical amplifier (SOA) and a tunable filter that narrows the emitted spectrum of the SOA and sweeps it through the desired wavelength range. In some embodiments, source 102 includes another conventional swept-source configuration, such as an amplified swept-ASE source combined with a tunable filter, etc. In some embodiments, source 102 is another tunable-wavelength source.

In operation, conventional power splitter 104 provides a first portion of light signal 112 to sensor network 106 as test signal 114. Sensor network 106 includes one or more sensors 118, each of which provides a corresponding output signal 120 to processor 108 (via photodiode 130-4), where the spectral characteristics of output signals 120 are indicative of an environmental stimulus at its respective location. It should be noted that the use of time as an indicator of wavelength gives rise to a need for the knowledge of other aspects of system 100, such as the sweep rate of source 102, the time-of-flight for light signals to and from each sensor in sensor network 106, and the like.

Processor 108 receives output signals 120, analyzes them, and provides output 134, based on the spectral characteristics of each sensor 118.

Processor 108 is a conventional data processing unit that includes a data acquisition system (DAQ). Processor 108 is operative for executing program commands, receiving and analyzing output signals 120 from sensor network 106 and outputs 132 from reference module 110, providing output signals to an end user, and providing control signals to other components in system 100, such as source 102. In some embodiments, processor 108 includes a field-programmable gate array (FPGA) operative for rapidly processing output signals 120. In some embodiments, processor 108 includes one or more sub-modules (e.g., an FPGA) that can be located elsewhere in system 100, such as in reference module 110.

It is critical that the wavelengths contained in output signals 120 are precisely known, which requires that, prior to system operation, the precise, desired spectro-temporal characteristics of light signal 112 are established. To facilitate this, power splitter 104 provides a second portion of light signal 112 (i.e., monitor signal 116) to reference module 110, which is included in a feedback loop used to calibrate source 102.

Reference module 110 (referred to hereinafter as module 110) includes power splitter 122, fiber Bragg grating (FBG) 124, athermal Fabry-Perot interferometer (AFPI) 126, gas cell 128, and detectors 130-1 through 130-3. The output signals of the AFPI, FBG, and gas cell are used, individually and in combination, to calibrate the spectral position and sweep range of light signal 112.

FBG 124 is a fiber Bragg grating whose filter response versus temperature is known very accurately. FBG 124 reflects an optical signal having a narrow spectral width at a known wavelength, λ1, while passing the remainder of light signal 112 to detector 130-2. As a result, output signal 132-2 includes a peak (in inverse) that corresponds precisely to the characteristic wavelength of FBG 124. In the illustrative embodiment, FBG 124 has a characteristic wavelength of 1545.5 nm. It should be noted that the spectral response of a typical fiber Bragg grating is temperature dependent; therefore, the temperature of FBG 124 is normally monitored via a temperature sensor, such as a thermistor.

AFPI 126 is an athermal wavelength reference that passes an optical signal comprising a series of peaks to detector 130-3, which provides corresponding output signal 132-3. The Fabry-Perot cavity of AFPI 126 is characterized by a free-spectral range (FSR) that gives rise to a fixed, known wavelength spacing (i.e., frequency) between these peaks. In the illustrative embodiment, AFPI 126 has an exemplary wavelength spacing of 800 pm (99.9861 GHz) and a reference peak at 1544.626 nm (194.0872 THz). AFPIs have been used for over a decade in countless deployments as telecom transmitter source wavelength lockers. It should be noted that, by design, the frequency-peak spacing of the output of AFPI 126 cannot be appreciably nonlinear.

Figure 2:
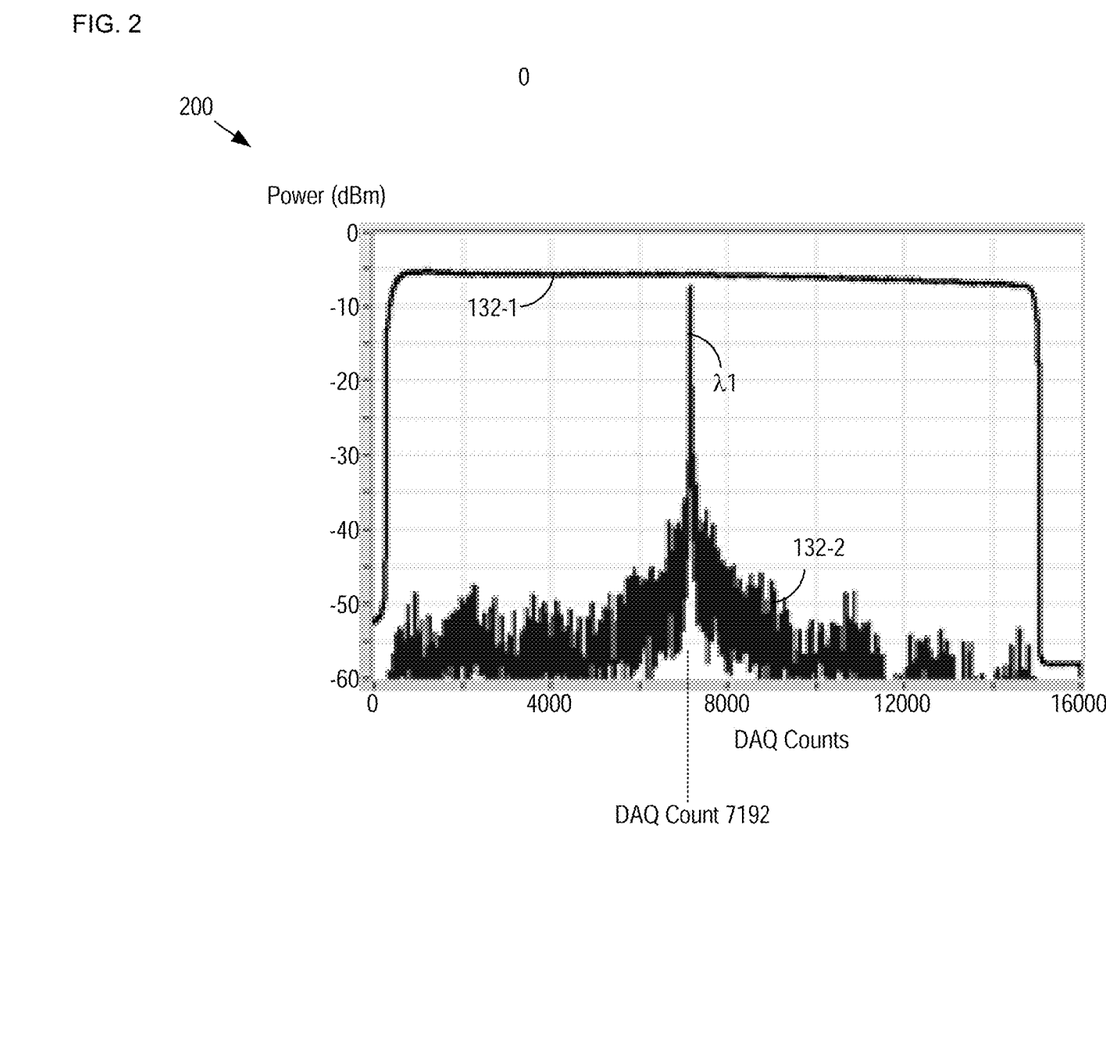
FIG. 2 depicts a plot of the output power of light signal 112 and the filter response of FBG 124 versus time for one wavelength-sweep period of the light signal.

FIG. 2 depicts a plot of the output power of light signal 112 and the filter response of FBG 124 versus time for one wavelength-sweep period of the light signal.

In plot 200, the power in light signal 112 is indicated by output signal 132-1. The filter response of FBG 124 is indicated by output signal 132-2, which is based on a second portion of light signal 112 after it has passed through the FBG and gas cell 128.

The known characteristic wavelength, $\lambda 1$, of FBG 124 is indicated by the peak of output signal 132-2. In the illustrative embodiment, it is known that $\lambda 1$ is equal to 1545 nm, which should be seen at a value of just below 7200 DAQ counts. If the "peak" of output signal 132-2 were seen at 7500 counts, for example, instead of just below 7200 counts, processor 108 would cause the bias voltage applied to source 102 to be increased. In similar fashion, if the peak seen at 7000 counts, processor 108 would cause the bias voltage applied to source 102 to be decreased.

Once source 102 is appropriately biased, the combination of the output signals of FBG 124 and AFPI 126 (i.e., output signals 132-2 and 132-3) is used to control and calibrate the entirety of the source sweep and set the swept-source scan amplitude (i.e., the breadth of the spectral width over which the output of source 102 is scanned). This begins with establishing a lookup table that correlates the known wavelengths of AFPI 126 and the DAQ counts at which peaks in output signal 132-3 are detected. Specifically, the output of FBG 124 is used as a "pointer" to register one of the wavelength peaks provided by AFPI 126 to a specific wavelength. Since the peaks provided by AFPI 126 have a known separation, this enables registration of all of the peaks to specific wavelengths.

Figure 3A:
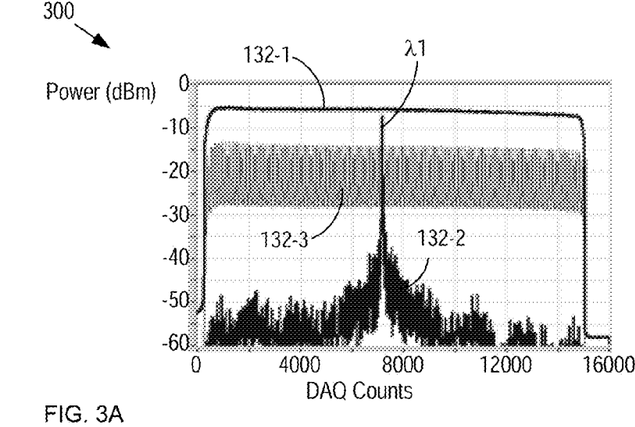
FIGS. 3A-B depict plots of the responses of FBG 124 and AFPI 126 versus DAQ count.
Figure 3B:
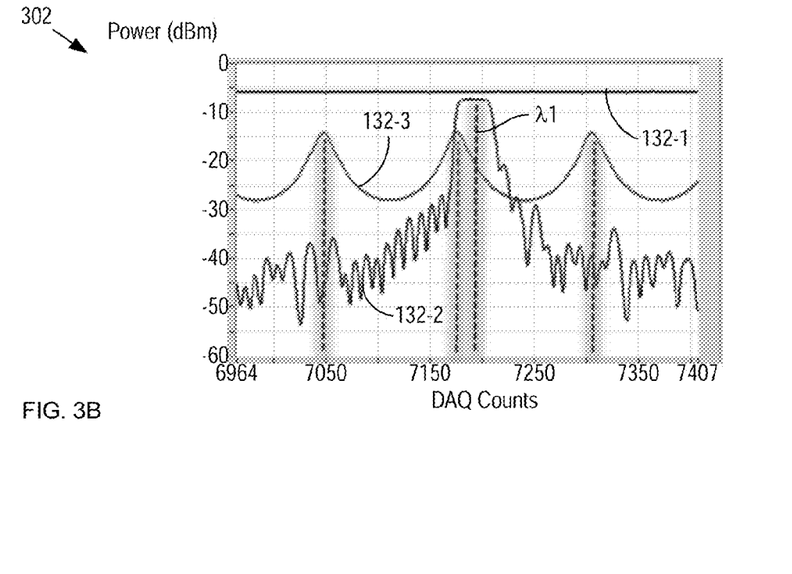

FIGS. 3A-B depict plots of the responses of FBG 124 and AFPI 126 versus DAQ count. Plot 300 shows these responses for an entire sweep period of light signal 112. Plot 302 shows an expanded view of the AFPI peaks within the proximity of the characteristic wavelength of FBG 124.

Once the lookup table for the AFPI wavelengths has been completed and their absolute wavelengths identified, system 100 can be used to convert timing signals from sensors 118 into calibrated wavelength values.

Before employing system 100 for critical sensor measurements, however, an additional calibration step is typically performed wherein the calibrated wavelength values are "tested" against the spectral output of gas cell 128 to establish a correction factor (e.g., to account for to thermal drift in AFPI 126, etc.), for example.

Gas cell 128 is a known calibration gas cell, such as a National Institute of Standards and Technology (NIST)-traceable, absolute wavelength standard. As discussed above, a calibrated gas cell provides temperature- and pressure-invariant spectral information against which system performance can be checked. Specifically, gas cell 128 absorbs light at a plurality of "known absorption lines" that are based on immutable molecular properties of the gas contained in the cell. For the purposes of this Specification, including the appended claims, the term "known absorption lines" is defined as the set of wavelengths at which a gas is known to absorb light (e.g., the table of absorption line wavelengths for a gas as indicated in the reference *Standard Reference Materials* published by NIST). In the illustrative embodiments, exemplary gas cell 128 contains acetylene, which has a rich set of known absorption lines.

Figure 4A:
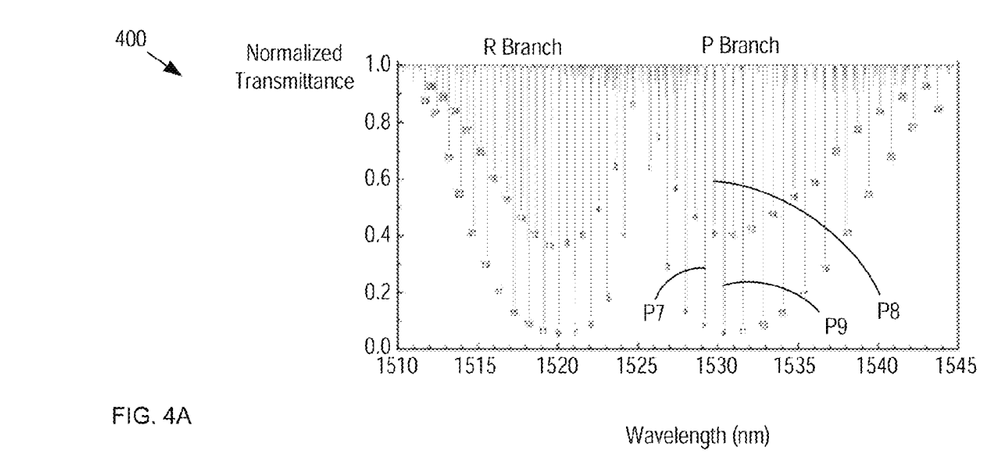
FIG. 4A depicts published absorption data for gas cell 128. Plot 400 includes spectral features corresponding to the published absorption lines for acetylene.

FIG. 4A depicts the known absorption lines for gas cell 128. Plot 400 includes spectral features corresponding to the published known absorption lines for acetylene.

Figure 4B:
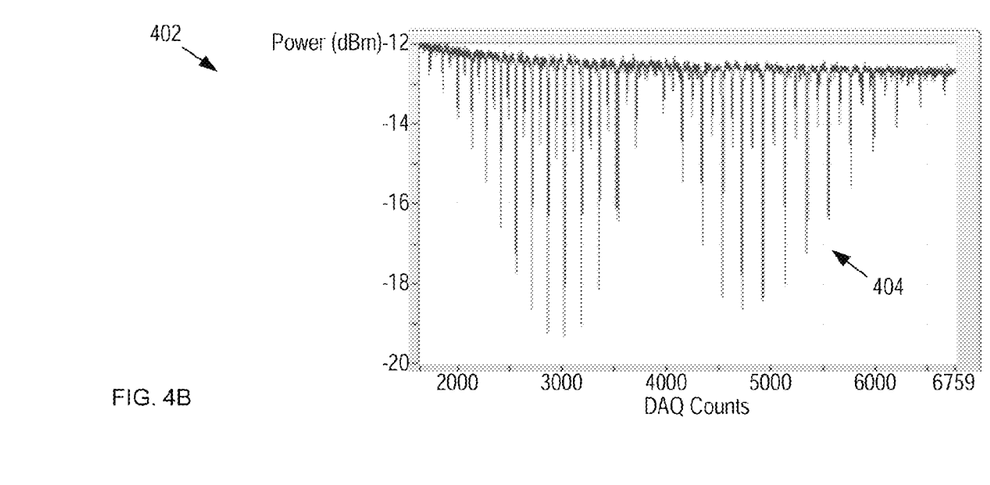
FIG. 4B depicts a measured absorption spectrum for gas cell 128. Plot 402 includes trace 404, which indicates the absorption lines of gas cell 128 as measured using system 100, where the spectral features are plotted in the time domain (i.e., versus DAQ count).

FIG. 4B depicts a measured absorption spectrum for gas cell 128. Plot 402 includes trace 404, which indicates the absorption lines of gas cell 128 as measured using system 100, where the spectral features are plotted in the time domain (i.e., versus DAQ count).

Figure 5:
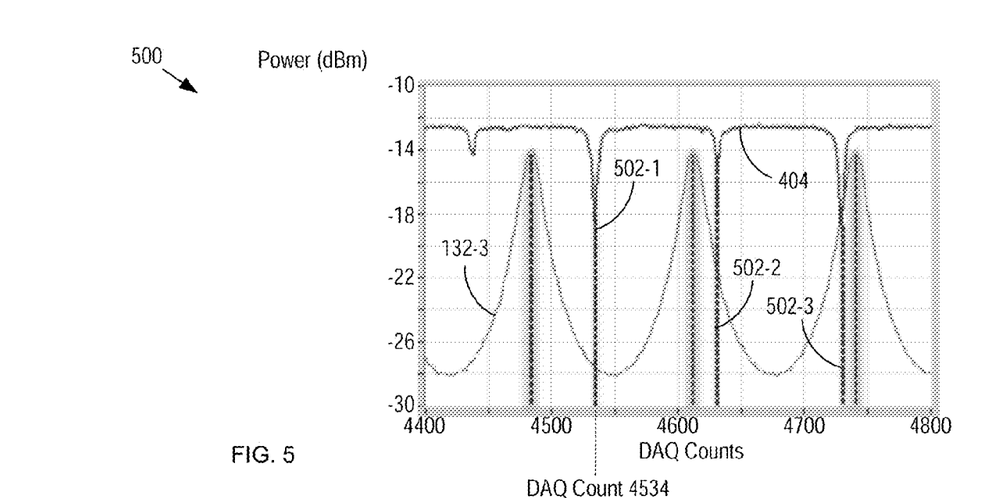
FIG. 5 depicts an expanded view of an overlay plot of the output signal from AFPI 126 and trace 404.

FIG. 5 depicts an expanded view of an overlay plot of the output signal from AFPI 126 and trace 404.

Using the relationship between DAQ counts and wavelength derived from trace 132-3, as described above, a linear interpolation is used to convert the detected DAQ counts of trace 404 into a set of N "measured" wavelengths, 502-1 through 502-N, for the absorption peaks of gas cell 128.

Figure 6:
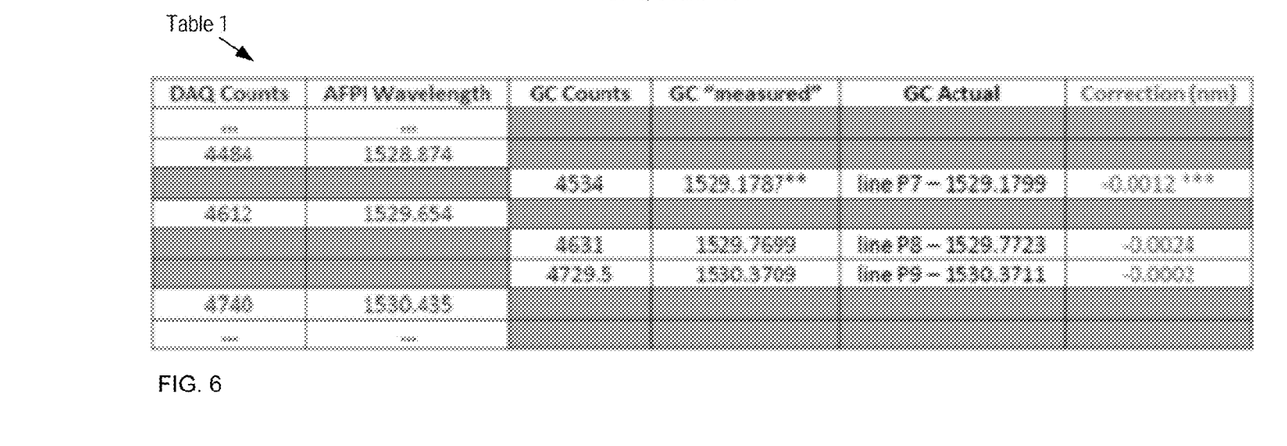
FIG. 6 provides a table that interrelates measured data for gas cell 128 with published values for the absorption lines of acetylene.

FIG. 6 provides a table that interrelates measured data for gas cell 128 with the known absorption lines for acetylene. From Table 1, a correction factor for system 100 is derived. For example, via system 100, absorption line 502 is determined as being located at DAQ count 4534. Using the DAQ count/wavelength relation derived above, this count is equivalent to a wavelength of 1529.1787 nm. Known absorption line P7 (shown in plot 400) is known to be at a wavelength of 1529.1799, however. As a result, a correction factor of −0.0012 nm is necessary to align these two values. Similar calculations are then made for additional known absorption lines (e.g., lines P8 and P9) and the derived correction factors are averaged to give rise to a global correction factor that is then applied to all of the measurements made by system 100.

Calibration of source 102 generates self-diagnostic information that mitigates some risk during operation of system 100. In some applications, however, it is critical that no bad data is passed to the end user by the sensor system.

It is an aspect of the present invention that a "fail-safe" method of operation, in which potential failure modes of system 100 are identified, predicted, and prevented, can be used to prevent an optical system providing an incorrect output, such as bad data, incorrectly generated optical signals (e.g., light generated at incorrect wavelengths, etc.) and the like. Further, the present invention enables a "key-fit" operational mode in which processor 108 can only provide output data to the end user when system 100 is operating within a user-defined error range. Embodiments of the present invention use the known absorption lines for gas cell 128 as a "lock" and measured absorption lines of the gas cell as a "key" that must fit this lock. System 100 is only enabled to provide output data 134 when the features of the measured gas-cell spectrum "fit" the known absorption lines within a user-defined error range.

Figure 7:
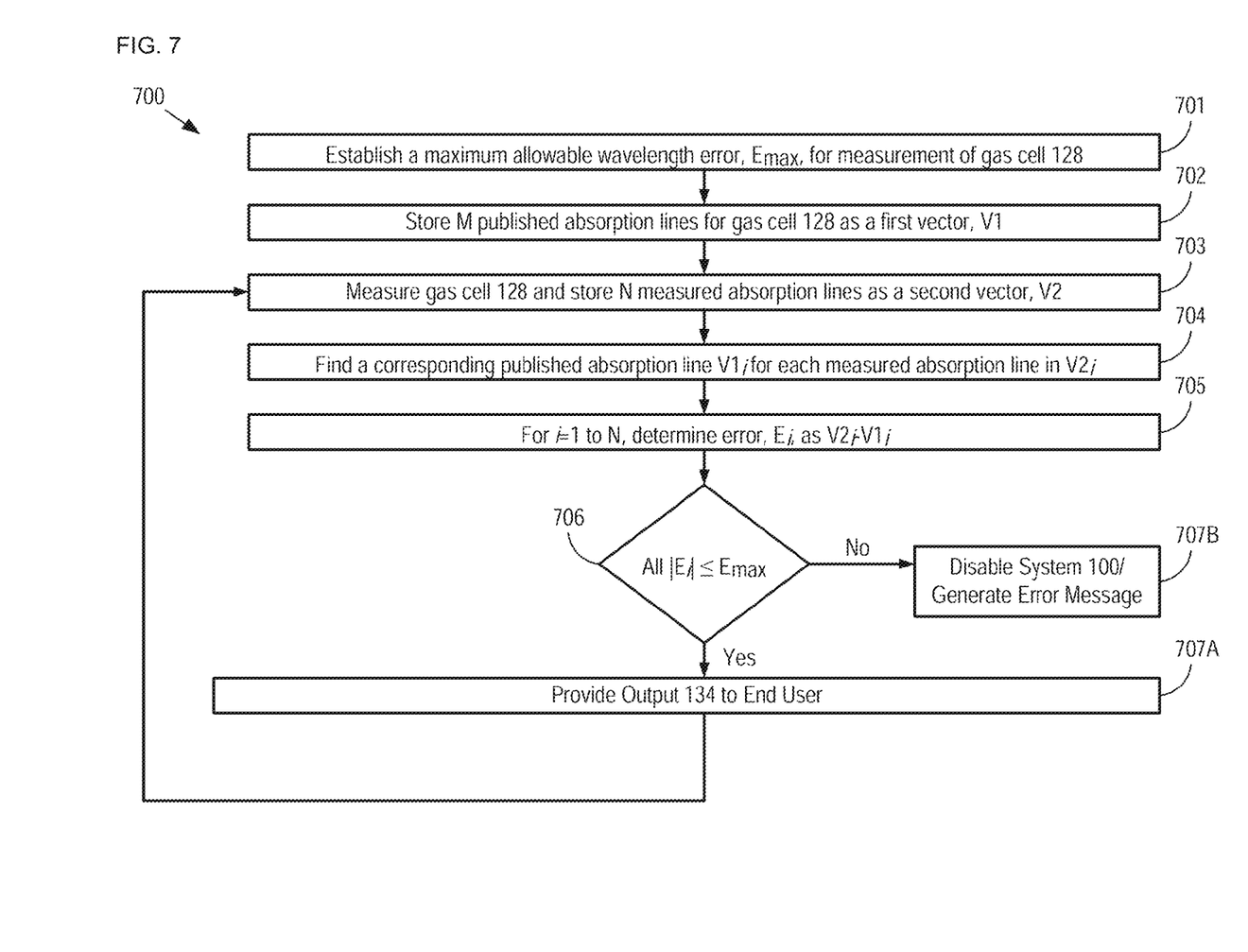
FIG. 7 depicts operations of a method for ensuring that system 100 provides no bad data in accordance with an illustrative embodiment of the present invention.

FIG. 7 depicts operations of a method for ensuring that system 100 provides no bad data in accordance with an illustrative embodiment of the present invention. Method 700 begins with operation 701, wherein a maximum allowable wavelength error, $E_{max}$, between the measured and known absorption lines for gas cell 128 is established.

At operation 702, M known absorption lines for gas cell 128 are stored in memory at processor 108 as a first vector, V1.

At operation 703, the N measured spectral features of gas cell 128 are stored in memory at processor 108 as a second vector, V2. In some embodiments, M and N are equal. In some embodiments, M and N are not equal.

At operation 704, a corresponding published absorption line is found for each of the measured spectral features in conventional fashion. An exemplary method for correlating these features includes, for each measured feature, determining the difference between it and M published absorption lines and selecting the published absorption line having the smallest difference. It should be noted that, in some embodiments, the set of published absorption lines includes more than M elements.

At operation 705, for i=1 through N, the magnitude of error between the each $V1_i$ and $V2_i$ (i.e., $|V1_i - V2_i|$) is determined.

At operation 706, for i=1 through N, the magnitude of each $E_i$ is compared to $E_{max}$.

If each of $E_1$ through $E_N$ is found to be less than or equal to $E_{max}$, then method 700 continues with operation 707A, wherein output 134 of system 100 is enabled and processor 108 passes the data from sensor network 106 to the end user.

If, on the other hand, any of $E_1$ through $E_N$ is found to be greater than $E_{max}$, method 700 continues with operation 707B, wherein system 100 is disabled so that no data is output to the end user and/or an error message is generated.

It should be noted that system 100 preferably includes a gas cell whose "fingerprint" pattern of spectral features is non-linear and non-repeating (i.e., the spacing between features is non-uniform). Such a spectral fingerprint mitigates the potential for a uniform and/or scaled shift/offset to generate $E_i$ values that are less than the maximum allowable error $E_{max}$.

It should be further noted that method 700 represents merely one method for comparing the fit of a set of measured spectral features (i.e., a "key") to a set of known spectral features (i.e., a "lock") and that one skilled in the art, after reading this Specification, will be able to determine other suitable methods without departing from the scope of the present invention. Examples of alternative methods within the scope of the present invention include, without limitation, comparing the total error generated by subtracting one spectrum from another, using image correlation to compare images of the generated spectra, and the like.

Figure 8A:
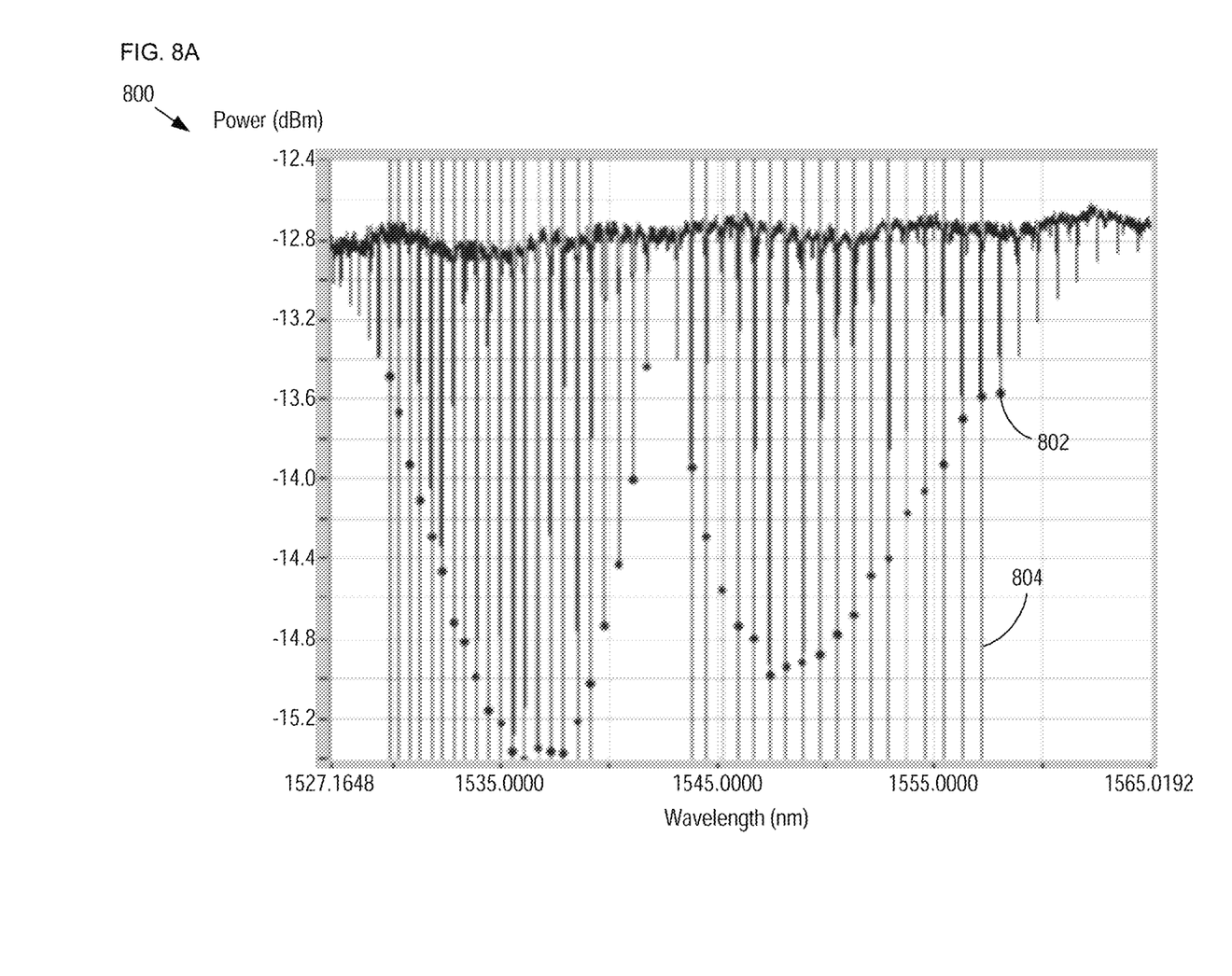
FIG. 8A depicts a plot of measured gas cell data and published gas cell data, wherein the measured and published data is in good agreement.

FIG. 8A depicts a plot of measured and known absorption lines for gas 128, wherein the measured and published data is in good agreement. Plot 800 depicts measured data 802 and known absorption lines 804 for acetylene gas cell 128.

Figure 8B:
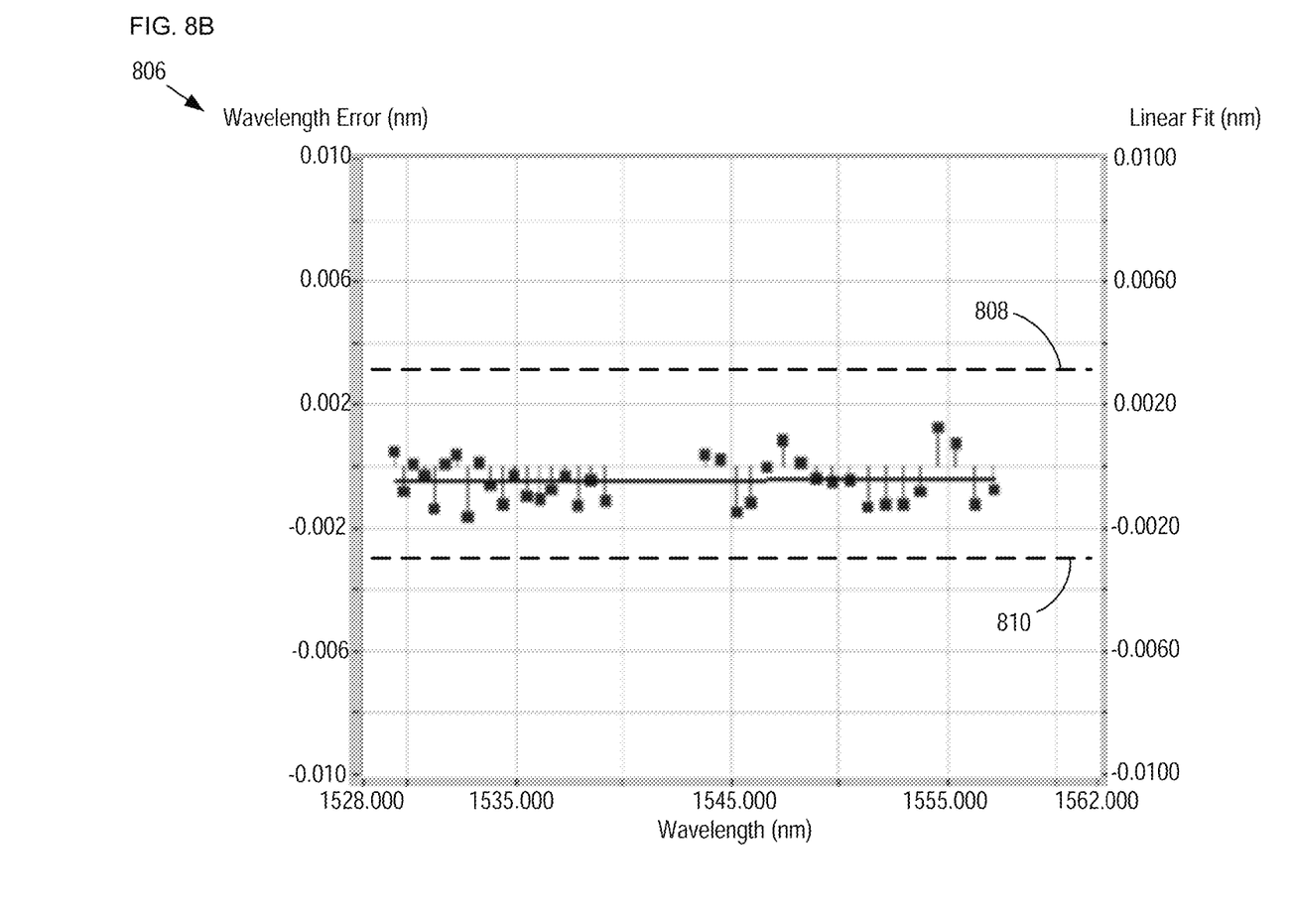
FIG. 8B depicts a plot of the magnitude of $E_1$ through $E_N$ for the data shown in plot 800.

FIG. 8B depicts a plot of the magnitude of $E_1$ through $E_N$ for the data shown in plot 800. Plot 806 includes lines 808 and 810, which represent the maximum allowable error $E_{max}$.

One of the potential system errors that can develop in system 100 is that of thermal drift of AFPI 126. Depending on the application, some minor drift of the AFPI might be tolerated, however.

Figure 9A:
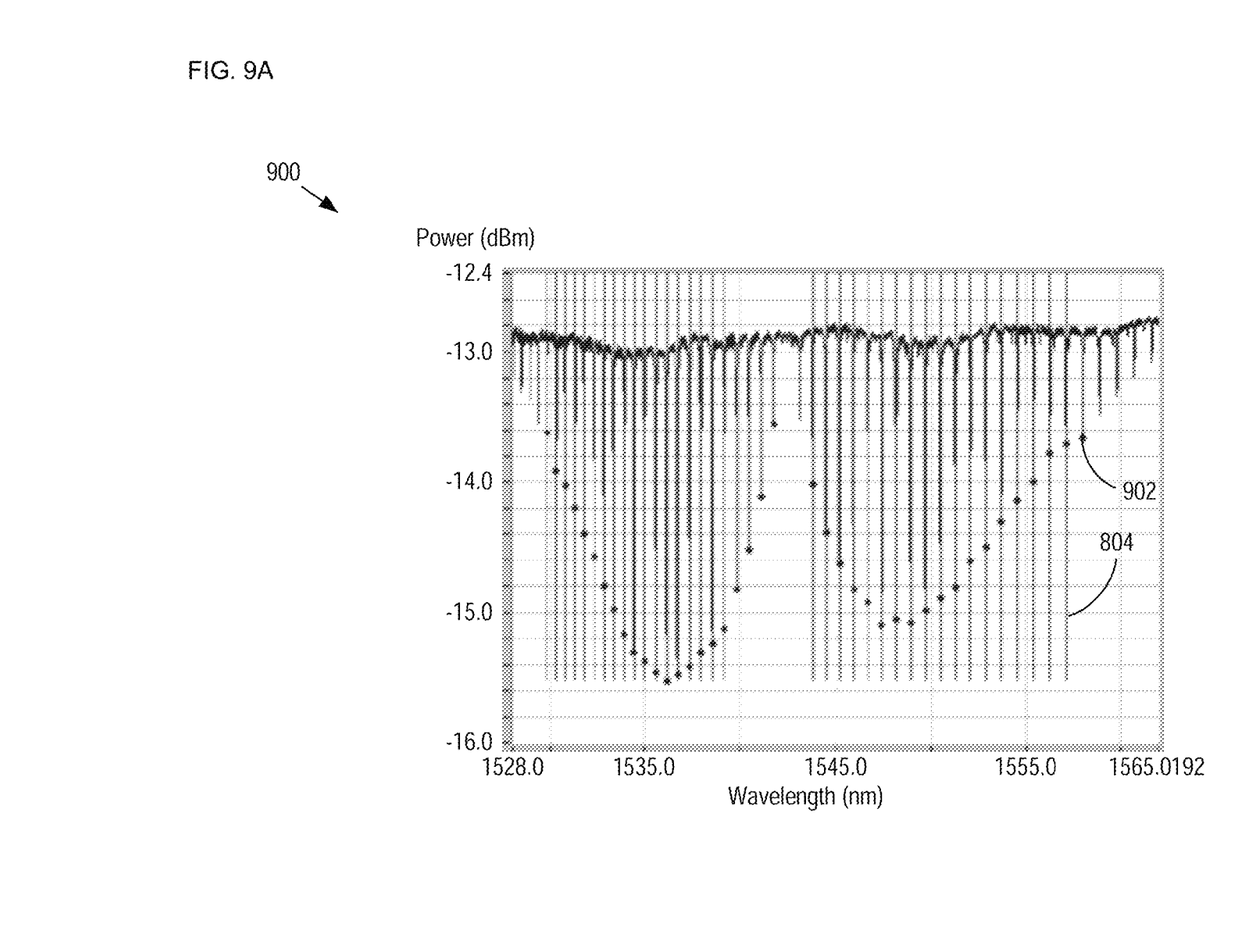
FIG. 9A depicts an exemplary plot of measured gas cell data and published gas cell data, wherein the measured data is in slight disagreement. Plot 900 shows the impact of a 1 pm drift of AFPI 126 on measured data 902.

FIG. 9A depicts an exemplary plot of measured gas cell data and known absorption lines for gas cell 128, wherein the measured data is in slight disagreement with the known absorption lines. Plot 900 shows the impact of a 1 pm drift of AFPI 126 on measured data 902.

Figure 9B:
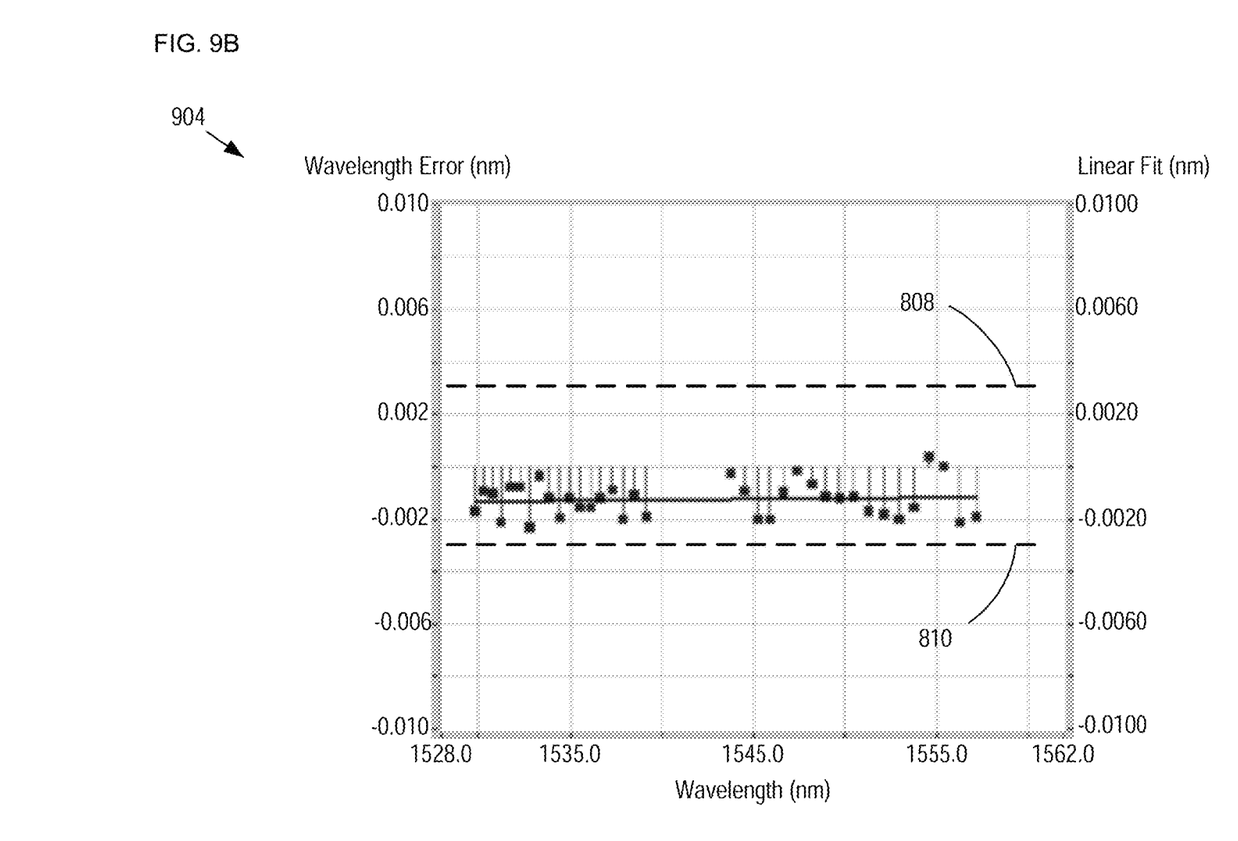
FIG. 9B depicts a plot of the magnitude of $E_1$ through $E_N$ for the data shown in plot 900. Plot 904 indicate that, even in the case of a slight drift of AFPI 126, the magnitude of each of $E_1$ through $E_N$ remains within the maximum allowable error $E_{max}$.

FIG. 9B depicts a plot of the magnitude of $E_1$ through $E_N$ for the data shown in plot 900. Plot 904 indicate that, even in the case of a slight drift of AFPI 126, the magnitude of each of $E_1$ through $E_N$ remains within the maximum allowable error $E_{max}$.

Figure 10:
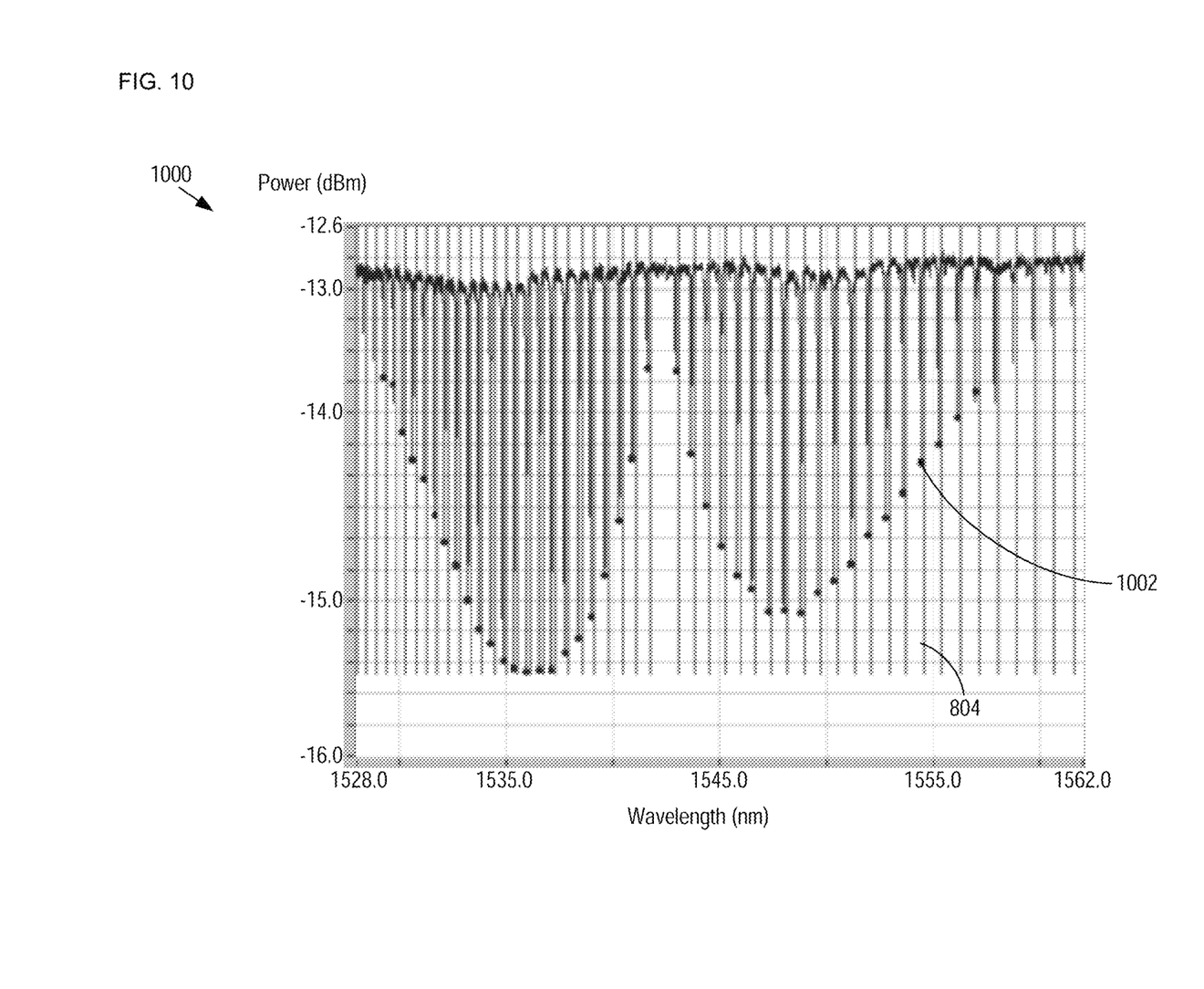
FIG. 10 depicts an exemplary plot of measured gas cell data and published gas cell data, wherein the measured data is in major disagreement due to a large thermally induced drift of AFPI 126.

FIG. 10 depicts an exemplary plot of measured gas cell data and known absorption lines for gas cell 128, wherein the measured data is in major disagreement due to a large thermally induced drift of AFPI 126. Plot 1000 shows the impact of a 200 pm drift of AFPI 126 on measured data 1002. Due to such a dramatic drift of the AFPI, measured data 1002 (i.e., the "key") does not fit the of known absorption lines 804 (i.e., the "lock") and the output of system 100 is disabled.

Figure 11:
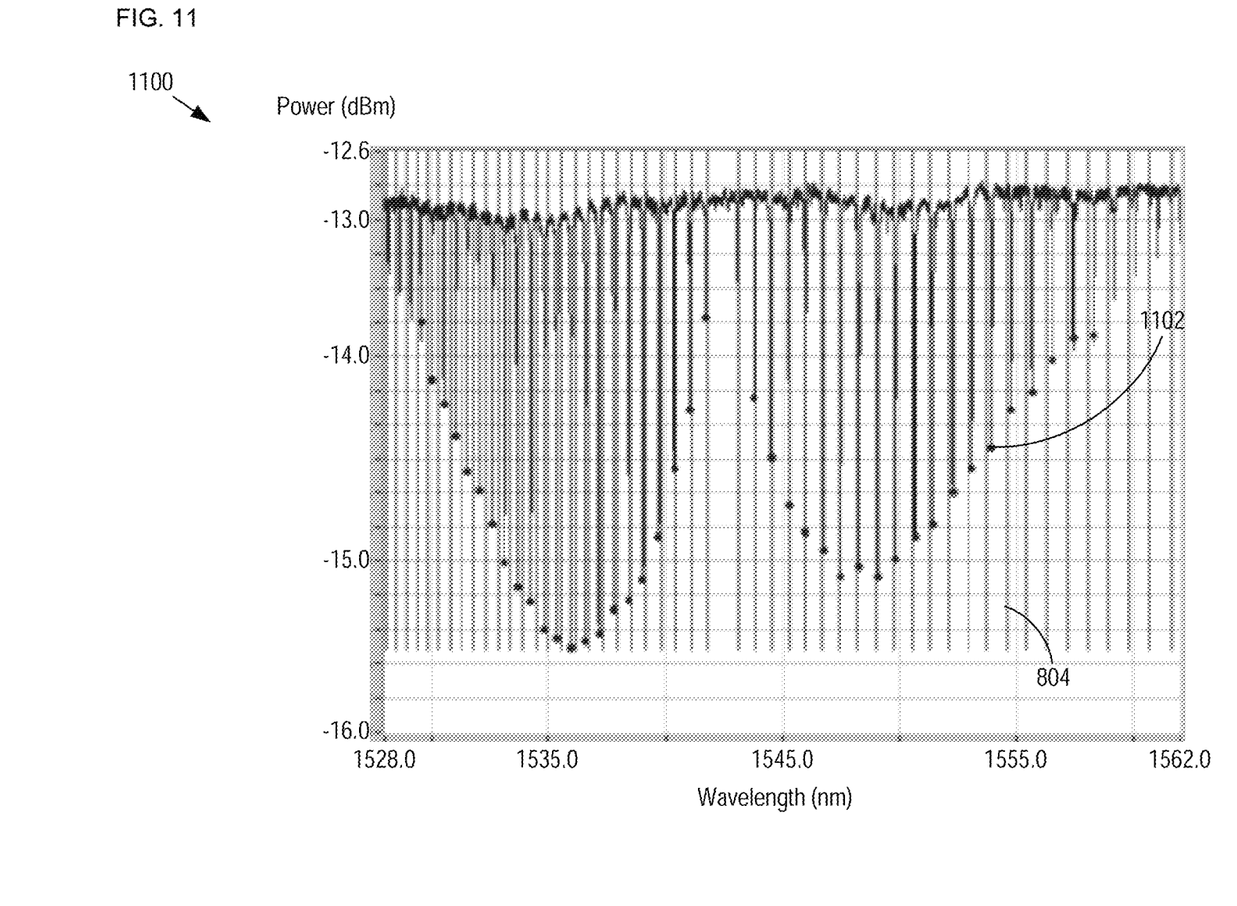
FIG. 11 depicts an exemplary plot of measured gas cell data and published gas cell data, wherein the measured data is in major disagreement due to an AFPI FSR error.

FIG. 11 depicts an exemplary plot of measured gas cell data and known absorption lines for gas cell 128, wherein the measured data is in major disagreement due to an AFPI FSR error. Plot 1100 shows that measured data 1102 does not fit the key of known absorption lines 804 because an error at AFPI 126 that manifests as an FSR error gives rise to a non-uniform wavelength deviation from the truth. As a result, the output of system 100 is disabled and no data is passed to the end user.

Figure 12:
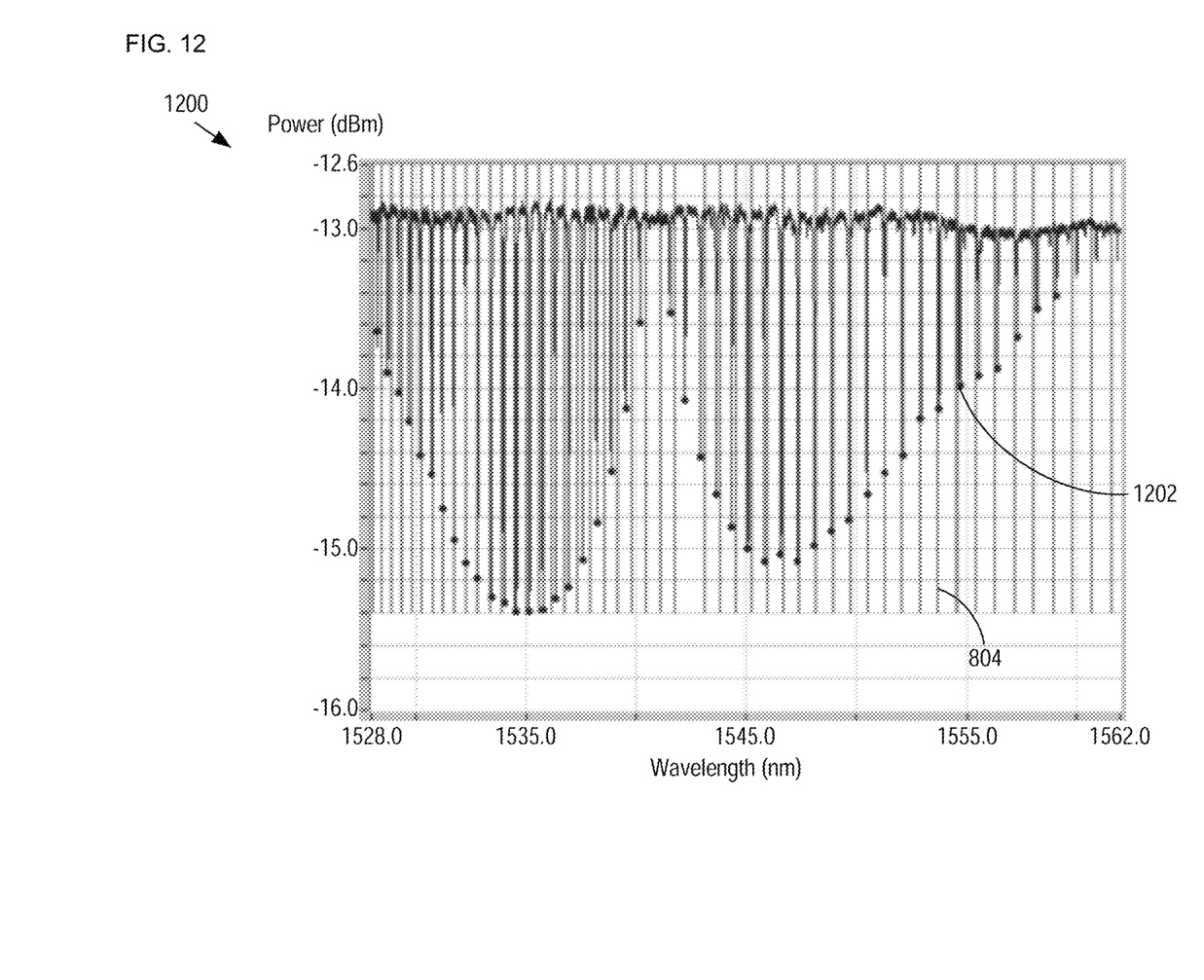
FIG. 12 depicts an exemplary plot of measured gas cell data and published gas cell data, wherein the measured data is uniformly offset from the truth due to a measurement error at FBG 124.

FIG. 12 depicts an exemplary plot of measured gas cell data and known absorption lines for gas cell 128, wherein the measured data is uniformly offset from the truth due to a measurement error at FBG 124. Plot 1200 shows that measured data 1202 does not fit the key of known absorption lines 804. As a result, the output of system 100 is disabled and no data is passed to the end user.

Figure 13:
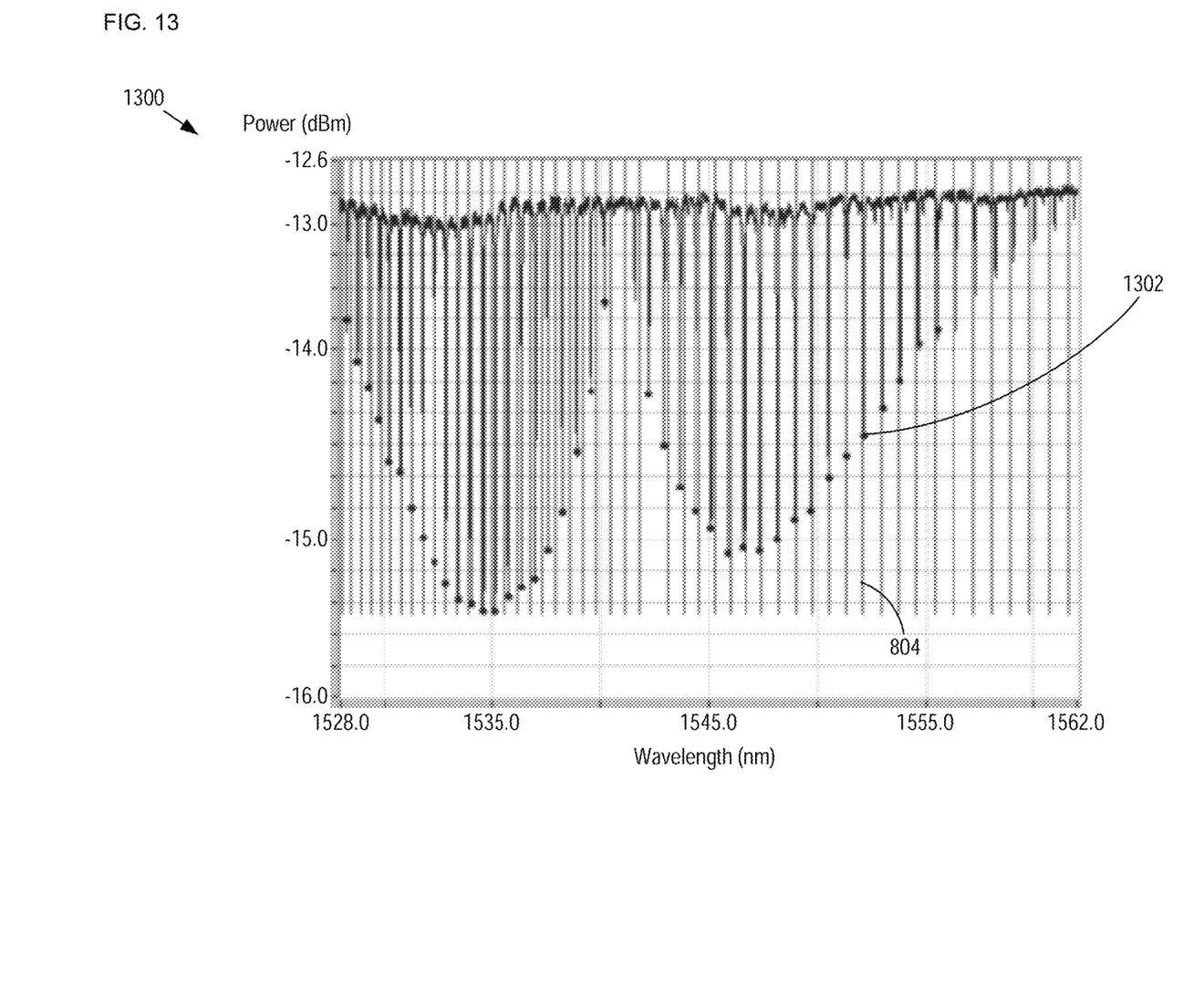
FIG. 13 depicts an exemplary plot of measured gas cell data and published gas cell data, wherein the measured data is uniformly offset from the truth due to an error at the thermistor that measures the temperature of FBG 124.

FIG. 13 depicts an exemplary plot of measured gas cell data and known absorption lines for gas cell 128, wherein the measured data is uniformly offset from the truth due to an error at the thermistor that measures the temperature of FBG 124. Plot 1300 shows that measured data 1302 does not fit the key of known absorption lines 804. As a result, the output of system 100 is disabled and no data is passed to the end user.

It should be noted that system 100 is suitable for preventing the output of bad data due to errors other than optical errors, such as the failure or degradation of an electrical component, calibration errors, and the like.

One skilled in the art will recognize, after reading this Specification, that, although method 700 is described herein with specific reference to system 100, "fail-safe" methods in accordance with the present invention are suitable for use with any system in which precise, absolute, knowledge of the wavelengths of generated and/or detected optical signals is critical, such as a WDM telecom or datacom system, etc.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for detecting errors in a sensor system, the method comprising:
   providing a gas cell characterized by a plurality of known spectral features;
   measuring the gas cell to determine a plurality of measured spectral features, wherein each of the plurality of measured spectral features corresponds to a different one of the known spectral features; and
   determining a plurality of error values, each error value being the difference between a different one of the measured spectral features and its corresponding known spectral features; and establishing a system error if any one of the plurality of error values exceeds a first user-defined threshold.

2. The method of claim 1 wherein the gas cell is measured by operations comprising:

interrogating the gas cell with a first light signal having a center wavelength that sweeps through a wavelength range during a first time period;

detecting the first light signal at a first detector after the first light signal has passed through the gas cell, the first detector providing a first output signal that is based on the detected first light signal;

determining a first value of the first output signal;

determining a plurality of second values of the first output signal, wherein each of the plurality of second values is characterized by a magnitude that is different from the magnitude of the first value by a second user-defined threshold; and establishing each of the plurality of second values as a different one of the plurality of measured spectral features.

3. The method of claim 2 wherein each of the plurality of second values is a local minimum of the first output signal.

4. The method of claim 2 wherein each of the plurality of second values is a local maximum of the first output signal.

5. The method of claim 2 wherein each of the plurality of known spectral features is a known absorption line and each of the plurality of measured spectral features is a measured absorption line.

6. The method of claim 1 further comprising disabling the transmission of data from the sensor system when the system error is established.

7. The method of claim 1 further comprising:

measuring the spectral response of a first optical element, wherein the first optical element is characterized by a known spectral component at a first wavelength; and adjusting the plurality of measured spectral features based on the measured spectral response of the first optical element.

8. The method of claim 7 further comprising the first optical element as a fiber-Bragg grating.

9. The method of claim 7 wherein the first wavelength is a function of the temperature of the first optical element, and wherein the method further comprises:

measuring the temperature of the first optical component; and adjusting the measured spectral response of the first optical element based on the measured temperature.

10. The method of claim 1 further comprising generating an error signal when the system error is established.

11. A method for preventing transmission of erroneous data from a system when the data is characterized by at least one error that exceeds a user-defined threshold, the method comprising:

measuring a first response of a gas to a first portion of a first light signal, wherein the first response of the gas is characterized by a first plurality of spectral features that is based on the composition of the first gas;

establishing a plurality of first wavelength values, wherein each of the plurality of first wavelength values is established for a different one of the first plurality of spectral features;

providing a plurality of second wavelength values, wherein each of the plurality of second wavelength values is based on a different one of a plurality of known spectral features for the gas;

establishing a one-to-one correspondence between the plurality of first wavelength values and the plurality of second wavelength values;

generating an error value for each of the first plurality of spectral features, where each of the plurality of error values has a magnitude equal to the difference between its respective first wavelength value and its corresponding second wavelength value; and enabling transmission of data from the system only when each of the plurality of error values is less than or equal to the user-defined threshold.

12. The method of claim 11 wherein the plurality of first wavelength values is established by operations comprising:

providing the first light signal such that it has a wavelength that sweeps through a wavelength range during a first time period;

establishing a first relationship between the wavelength of the first light signal and time within the first time period;

measuring the first response of the gas to the first portion of the first light signal during the first time period;

establishing the plurality of first wavelength values based on the first relationship.

13. The method of claim 12, wherein the first relationship is established by operations comprising:

measuring a second response of a first optical element to a second portion of the first light signal during the first time period, wherein the response of the first optical element is characterized by a first known spectral component at a first wavelength;

determining a second relationship between a first time in the first time period and the first wavelength; and establishing the first relationship based on the second relationship.

14. The method of claim 13, wherein the first relationship is established by operations further comprising:

measuring a third response of a second optical element to a third portion of the first light signal during the first time period, wherein the response of the third optical element is characterized by a first plurality of spectral components having a first known wavelength separation;

establishing a third relationship between a plurality of times in the first time period and the first plurality of spectral components; and establishing the first relationship based further on the third relationship.

15. The method of claim 13 wherein the first wavelength is a function of temperature of the first optical element, and wherein the method further comprises measuring the temperature of the first optical element.

16. The method of claim 12 further comprising generating an error signal when at least one of the plurality error values is greater than the user-defined threshold.

* * * * *